United States Patent [19]

Kalagidis

[11] Patent Number: 4,638,197
[45] Date of Patent: Jan. 20, 1987

[54] MAGNETIC FLUX SHIELD AND ENHANCER FOR BRUSHLESS MOTORS

[75] Inventor: Memorial Kalagidis, North Canton, Ohio

[73] Assignee: Ametek, Inc., Kent, Ohio

[21] Appl. No.: 781,409

[22] Filed: Sep. 27, 1985

[51] Int. Cl.$^4$ ............................................. H02K 11/00
[52] U.S. Cl. ................. 310/67 R; 310/68 R; 310/268
[58] Field of Search .................. 310/67 R, 268, 256, 310/68 B, 68 R

[56] References Cited

U.S. PATENT DOCUMENTS

| | | | |
|---|---|---|---|
| 3,548,224 | 12/1970 | Dittrich et al. | 310/10 |
| 4,115,715 | 9/1978 | Müller et al. | 310/67 R |
| 4,286,184 | 8/1981 | Kögler | 310/67 R |
| 4,574,211 | 3/1986 | Müller et al. | 310/68 R |

Primary Examiner—Patrick R. Salce
Assistant Examiner—D. L. Rebsch
Attorney, Agent, or Firm—Oldham, Oldham & Weber Co.

[57] ABSTRACT

A magnetic flux shield and enhancer for brushless motors, with a plurality of clips having orthogonal legs in flux-conducting relationship to the rotor and permanent magnets of the motor. The permanent magnets are affixed to an inner circumferential surface of the rotor. Each of the clips receives a Hall sensor for activation by the magnets as they pass by. A first leg of the clip is configured so as to concentrate the flux from the magnets to an associated Hall sensor, while shielding the Hall sensor from flux emanating from the stator assembly of the motor. A second leg of the clip, connected to the first leg, provides a path for the flux through the rotor for return to the magnet from which it originated.

11 Claims, 4 Drawing Figures

MAGNETIC FLUX SHIELD AND ENHANCER FOR BRUSHLESS MOTORS

TECHNICAL FIELD

The invention herein resides in the art of electric motors and, more particularly, to polyphase electronically commutated motors, commonly referred to as brushless motors. More specifically, the invention relates to a device for defining a magnetic path through a Hall switch in such a motor, while shielding the Hall switch from leakage flux and the like.

BACKGROUND ART

Heretofore, various types of brushless motors have been known and devised in the industry. In such motors, the stator windings must be supplied with electric power in the appropriate sequence in order to produce rotor shaft torque. It is known to use Hall effect devices to sense rotor position and to thereby control the excitation of the stator windings through appropriate control and switching circuitry. Hall digital switches, excited by magnetic flux changes, have been used to create the signals to provide the correct sequence for power application to the stator windings from an electronic controller to which the Hall digital switches are connected. A suitable Hall effect device is the bipolar Hall effect digital latch shown in Engineering Bulletin 27608 of the Semiconductor Division of Sprague Electric Company of Concord, N.H. As with most such Hall digital switches, these devices require the sensing of certain flux densities in order to switch and thereby provide the proper output voltages to the circuits of the electronic controller connected to the stator windings.

In operation of brushless motors, it has been found that if the available flux densities are not sufficient to actuate the Hall effect switch, electronic power output semiconductor devices of the controller will not switch on and off properly. This will cause them to draw high currents considerably beyond their capacities, resulting in their ultimate failure. Further, transient flux fields from stator conductors and core sections have also been found to cause false switching of the Hall ditigal switches, again resulting in improper operation of the controller circuitry and ultimate destruction of the same. In summation, it has been found that the Hall effect sensors or switches used in brushless motors must be maintained within a strong magnetic path of low reluctance, while being shielded from stray flux present within the environment of the motor itself.

The aforesaid problems inherent with brushless motors have been aggravated by the fact that the rotating magnets of such motors, coupled with the flux conduction through the stator core generates a dynamic flux field which is difficult to shield or control. Additionally, attempts to reduce the size of the packaging of such brushless motors inherently places the stator windings close to the switches themselves.

SUMMARY OF THE INVENTION

In light of the foregoing, it is the first aspect of the invention to provide a clip for receiving a Hall effect switch which is operative to direct to the switch only that flux which comes from the rotor magnetic circuit, greatly limiting the effect of any other flux sources upon the switch.

Another aspect of the invention is the provision of a clip for receiving a Hall switch which provides a good magnetic flux path, of significantly reduced reluctance, and providing a return path for the flux to the backside of the rotor magnet.

Still another aspect of the invention is the provision of a clip for receiving a Hall switch which acts as a shield, receiving extraneous flux from the stator core and windings to a point of saturation before such extraneous flux can affect the Hall switch.

The foregoing and other aspects of the invention which will become apparent as the detailed description proceeds are achieved by: a motor, comprising a rotor having a plurality of magnetic elements uniformly positioned about a first surface thereof; a plurality of magnetic sensing devices in fixed spaced relationship from said first surface; and a magnetic flux conducting element extending from each said magnetic sensing device to a point in juxtaposition to said rotor.

Other aspects of the invention are achieved by: the improvement in a brushless motor having a rotor with permanent magnets affixed to a circumferential surface thereof in fixed spaced relationship to each other and a stator core and winding maintained therein, comprising a plurality of magnetic sensors in fixed spaced relationship to each other and in common spaced relationship from a path defined by the permanent magnets upon rotation of the rotor; and retaining means for receiving each of said sensors and defining a magnetic flux path from the magnets and through said sensors.

DESCRIPTION OF DRAWINGS

For a complete understanding of the objects, techniques, and structure of the invention reference should be had to the following detailed description and accompanying drawings wherein.

BEST MODE FOR CARRYING OUT THE INVENTION

Figure 2:
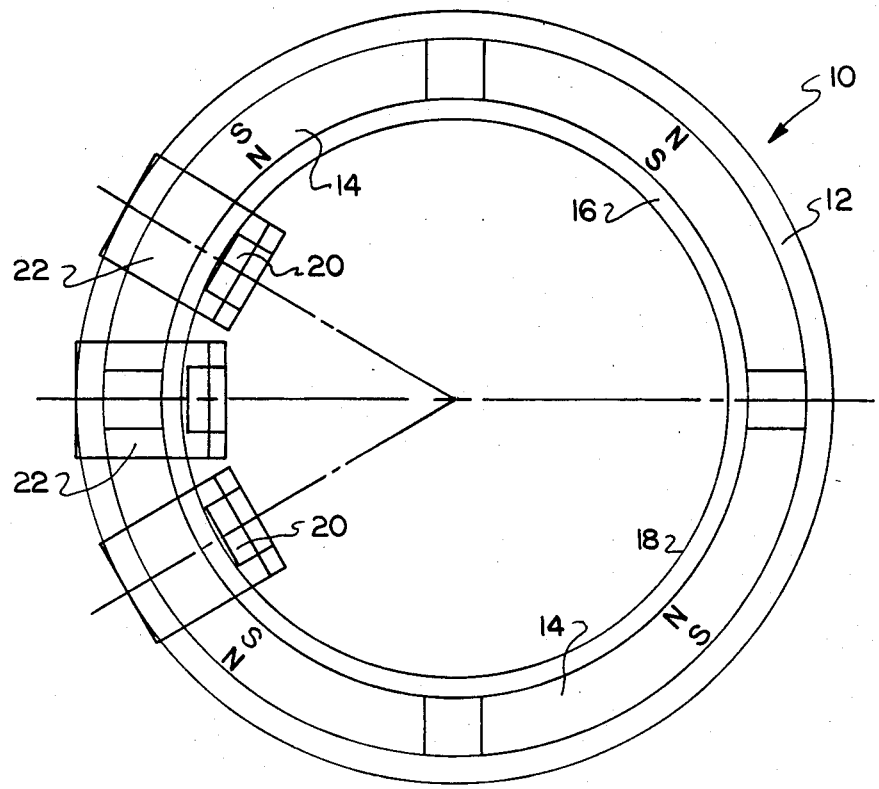
FIG. 2 is a top plan view of the brushless motor of FIG. 1.
Figure 1:
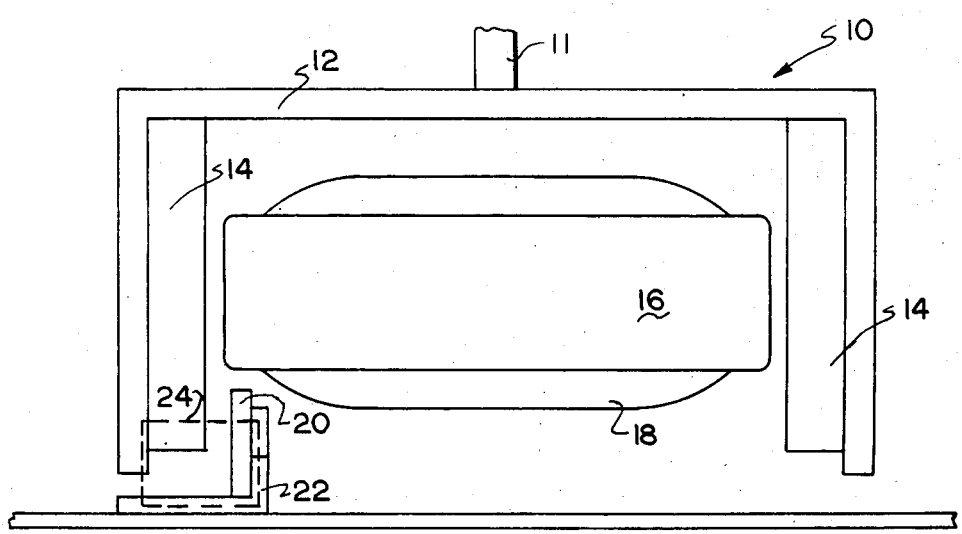
FIG. 1 is an illustrative cross sectional view of a brushless motor according to the invention.

Referring now to the drawings and more particularly FIGS. 1 and 2, it can be seen that a brushless motor according to the invention is designated generally by the numeral 10. The motor 10 includes a rotor 12 of inverted cup shape. It will be understood that a shaft 11 would extend from the rotor 12 to an external point where connection could be made by means of an arbor or the like for transmitting the torque generated by the motor 10. Attached to the inner surface of the rotor 12 in uniformly spaced relationship, are a plurality of permanent magnets 14. The polarity of the magnets is as shown in the drawing. It will be noted that the motor 10 is a four pole motor, thus the presentation of four permanent magnets.

Centrally maintained within the rotor 12 is a stator core 16 and stator windings 18. The core and windings 16,18 are somewhat standard in the art and the details of the structure thereof are not elaborated upon herein. Suffice it to say that the windings 18 would typically comprise three interconnected windings as is now well known.

Determination of the position of the rotor 12 and the corresponding energization of selected pairs of the three coils of the stator winding 18 is achieved by the uniform positioning of the three Hall switches or latches 20. It will be appreciated that the switches 20 are connected to the controller circuitry for the motor 10 for achieving the desired selective excitation of the stator windings.

As shown in FIG. 1, the Hall switches 20 are received in clips 22 which will be described in detail later. The clips 22 and the rotor 12 are preferably constructed of steel having a high iron content to provide for a good flux path, being highly permeable to magnetic flux. As further shown in FIG. 1, the flux path between the permanent magnet 14 and the Hall switch 20 is shown by the dashed line 24. The flux passes from the magnet 14 to the switch 20 across the air gap therebetween. It then enters the clip 22, passing through the right angled legs thereof, enters the rotor 12 by crossing the air gap between the clip 22 and the rotor 12, and returns to the magnet 14. It should be noted that the Hall switch 20 and clip 22 are retained within the rotor 12, allowing for compact motor design, having exterior dimensions defined by the rotor 12 itself.

Figure 3:
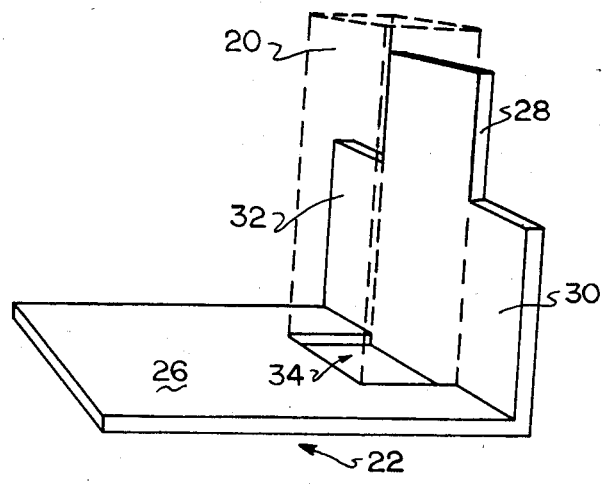
FIG. 3 is a perspective view of the switch-receiving clip of the invention.

With reference now to FIG. 3, it can be seen that the clip 22 includes a base surface 26 having orthogonally extending from one end thereof a back comprising a center portion 28 with two side portions 30,32. The center portion 28 is of greater height than the side portions 30,32 since it is the center portion which is in direct alignment with the switch 20. The magnetic flux from the magnet 14 is directed most particularly to the center section 28, being of greater size and mass, resulting in the passage of magnetic flux directly through the sensing portion of the Hall switch 20. The side portions 30,32 provide a flux path from the center section 28 along either side of the opening 34 in the base 26 which is provided for receiving the switch 20 as shown.

It should be appreciated that the clip 22 provides an excellent flux path from the magnet 14 to the switch 20 and returned to the magnet 14. However, the clip 22 also provides a shield for the switch 20 from extraneous or transient flux which may be generated within the confines of the rotor 12 via the stator core and windings 16,18. Any flux leakage from the stator 16,18 resulting from energization of the windings thereof would heretofore have leaked to the switch 20 and, if of sufficient amplitude, would have activated the switch 20. However, as noted from FIGS. 1 and 3, the back portion 28-32 of the clip 22 is effectively interposed between the sensing portion of the switch 20 and the stator core and windings 16,18. Flux leakage is therefore attracted to the highly conductive clip 22 rather than the switch 20. Before affecting the switch 20, the clip 22 must first reach magnetic saturation. However, the highly transient nature and short duration of the extraneous flux from the stator effectively eliminates the possibility that saturation will be reached. Accordingly, the clip 22 shields the switch 20 from these transient flux fields.

The flux must flow from the magnet 14 through the switch 20 into the back portion 28-32 of the clip 22 and not directly from the magnet 14 to the base portion 26 of the clip 22. To eliminate this possible short circuit condition, the clip 22 must be so configured and spaced with respect to the magnets 14 and the rotor 12 as to provide less reluctance from the magnets 14 to the back portion 28-32 then from the magnets 14 to the base portion 26. Similarly, the reluctance from the base portion 26 to the rotor 12 must be less than from the magnet 14 to the base portion 26.

With further consideration to the specific geometry of the structure of the invention, it will be appreciated that the design of the system must be such that the flux necessary to excite the Hall switch 20 must equal the magnetomotive force provided by the magnet 14 divided by the sum of the reluctance of the gap between the magnet 14 and the Hall switch 20, plus the reluctance of the Hall switch 20, plus the reluctance of the clip 22, plus the reluctance of the gap between the clip 22 and the rotor 12, plus the reluctance of the rotor, plus the reluctance of the magnet. With the clip 22 and the rotor 12 constructed of steel having a high iron content, the reluctance of the clip 22 and the rotor 12 will be significantly less than the sum of the other recited reluctances. Accordingly, the geometry of the brushless motor of the invention must be devised such that the magnetic flux necessary to actuate the Hall switch 20 is substantially equal to the magnetomotive force of the magnet 14 divided by the sum of the reluctance of the gap between the magnet 14 and the Hall switch 20, plus the reluctance of the Hall switch 20, plus the reluctance of the gap between the clip 22 and the rotor 12, plus the reluctance of the magnet 14.

With further respect to the clip 22, it should be understood that the physical structure thereof should be sufficient to optimize flux concentration through the Hall switch 20. To achieve this, the width of the clip 22 extending between the outer edges of the side portions 30,32 is kept small. Similarly, the height of the clip 22 from the base thereof to the top of the side portions 30,32 is kept small. By keeping these dimensions reduced, flux concentration through the sensing portion of the switch 20 to the center section 28 is increased and any parallel flux path which could divert flux from the Hall switch 20 is minimized.

As discussed above, the clip 22 is also used to shield the Hall switch 20 from leakage flux from the stator assembly 16,18. By suitably locating, shaping, and sizing the clip 22, the Hall switch 20 can be so shielded. Simply stated, leakage flux from the stator assembly 16,18, can take two substantially parallel paths. In the first path, the flux leaves the stator assembly 16,18, crosses the gap to the Hall switch 20, passes through the end portion of the clip 22, and returns across the gap to the stator assembly 16,18. Another path for the leakage flux passes from the stator assembly 16,18, across an air gap and through the back portion of the clip 22, and across another air gap for return to the stator assembly 16,18. It should be understood that by closing the gap between the stator assembly 16,18, and the back portion 28-32 of the clip 22, while increasing the gap between the stator assembly 16,18 and the Hall switch 20, flux leakage will take the path of least reluctance, avoiding the Hall switch 20.

Since the back portion 28-32 of the clip 22 must accommodate the primary switching flux from the magnets 14 through the Hall switch 20, as well as the leakage flux from the stator assembly 16,18, it is apparent that sufficient material of low reluctance must be used as the composition of this back portion. Obviously, by increasing the width or thickness of this back portion, sufficient flux conducting capability can be achieved. So as to maintain a high concentration of flux through the Hall switch 20, it is preferred, as described above, to keep the width of the back portion of the clip 22 sufficiently narrow. Accordingly, the thickness of this back portion may be regulated so as to be able to handle both the switching flux from the magnets 14 and the leakage flux of the stator assembly 16,18. Further enhancements may be achieved by increasing the thickness of the center back portion 28 beyond the thickness of the side portions 30, 32.

Figure 4:
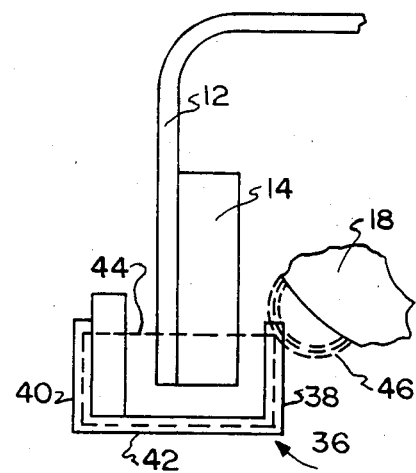
FIG. 4 is a partial sectional view of yet another embodiment of the clip of the invention.

With reference now to FIG. 4, yet another embodiment of the invention may be seen in illustrative partial cross sectional view. In this case, a U-shaped clip 36 is adapted for receiving a hall switch 20 exterior of the rotor 12 and in juxtaposition to the moving magnets 14. The clip 36 includes a base portion 42 having at each end thereof normally extending end portions 38,40. The flux path is defined by the dashed line 44. It will also be noted from FIG. 4 that in this embodiment the switch 20 is kept separate and apart from the stator, the stator coils 18 being shown in the drawing. Accordingly, there is little chance that the switch 20 will be adversely affected by stray or transient flux from the stator. As shown, flux lines 46 from the windings 18 reach the end portion 38 of the clip 36 but do not affect the switch 20. Of course, the reluctance of the various magnetic flux paths for this embodiment are designed according to the parameters above to assure that sufficient flux concentration is available to actuate the Hall switch 20 without incurring any short circuiting.

Thus it can be seen that the objects of the invention have been achieved by the structure presented hereinabove. While in accordance with the patent statutes only the best mode and preferred embodiments of the invention have been presented and described in detail, the invention is not limited thereto or thereby. Accordingly, for an appreciation of the true scope and breadth of the invention reference should be had to the following claims.

What is claimed is:

1. A motor, comprising:
a rotor having a plurality of magnetic elements uniformly positioned about a first surface thereof;
a plurality of magnetic sensing devices in fixed spaced relationship from said first surface; and
a magnetic flux conducting element extending from each said magnetic sensing device to a point in juxtaposition to said rotor, said magnetic flux conducting element having first and second orthogonal legs, said first leg having a center portion in alignment with said magnetic sensing device and side portions extending on each side of said center portion, and beyond said magnetic sensing device, said center portion being of less magnetic reluctance than each of said side portions.

2. The motor according to claim 1 wherein said sensing devices each comprise a Hall-effect sensor maintained immediately adjacent said first leg of each of said flux conducting elements.

3. The motor according to claim 2 which further includes a stator core and winding within said rotor, said first surface being an inner surface of said rotor, and said first leg being maintained within said rotor and substantially parallel to said first surface.

4. The motor according to claim 3 wherein said second leg has an opening therein for receiving an end of said Hall-effect sensor, said side portions providing a magnetic flux path from said center portion around said opening.

5. The motor according to claim 4 wherein the reluctance from said magnetic elements to said flux conducting element is greater than both the reluctance from said magnetic elements to said first leg and the reluctance from said second leg to said rotor.

6. The motor according to claim 4 wherein the reluctance between said stator and said first leg is less than the reluctance between said stator and said Hall-effect sensor.

7. The improvement in a brushless motor having a rotor with permanent magnets affixed to a circumferential surface thereof in fixed spaced relationship to each other and a stator core and winding maintained therein, comprising:
a plurality of magnetic sensors in fixed spaced relationship to each other and in common spaced relationship from a path defined by the permanent magnets upon rotation of the rotor; and
retaining means for receiving each of said sensors and defining a magnetic flux path from the magnets and through said sensors said retaining means comprising orthogonal legs, a first leg substantially parallel to the circumferential surface of the rotor and a second leg substantially perpendicular thereto, said first leg being in magnetic flux conducting communication with the permanent magnets and said second leg being in magnetic flux conducting communication with the rotor, said first leg of each said retaining means being in magnetic flux conducting communication with the stator, the reluctance between said first leg and the stator being less than the reluctance between the stator and the associated said magnetic sensor.

8. The improvement in a brushless motor as recited in claim 7 wherein the reluctance between said second leg and the permanent magnets is greater than both the reluctance between the rotor and said second leg and between the permanent magnets and the associated magnetic sensor.

9. The improvement in a brushless motor as recited in claim 7 wherein said first leg includes a center portion and two side portions, one on each side of said center portion, said side portions being of less size and greater reluctance than said center portion, said associated magnetic sensor being aligned with said center section.

10. The improvement in a brushless motor as recited in claim 9 wherein said second leg is characterized by an opening therein, said opening aligned with said center section and receiving an associated said magnetic sensor, said side portions providing a magnetic flux path from said center portion to said second leg and around said opening.

11. A motor, comprising:
a rotor having a plurality of magnetic elements uniformly positioned about a first surface thereof;
a plurality of magnetic sensing devices in fixed spaced relationship from said first surface; and
a U-shaped magnetic flux conducting element extending from each said magnetic sensing device to a point in juxtaposition to said rotor having a leg within and a leg without said rotor, said sensing device being maintained adjacent said leg of said U-shaped element which lies outside of said rotor, and said leg of said U-shaped element which lies within said rotor extending adjacent a stator core and winding within said rotor.

* * * * *